May 28, 1968

A. W. CHURCHILL 3,385,559

RELEASABLE LATCH MECHANISM FOR CONTROL
DEVICES, VALVES, AND THE LIKE

Filed May 12, 1965

INVENTOR:
ALAN W. CHURCHILL
BY
Breitenfeld & Levine
ATTORNEYS

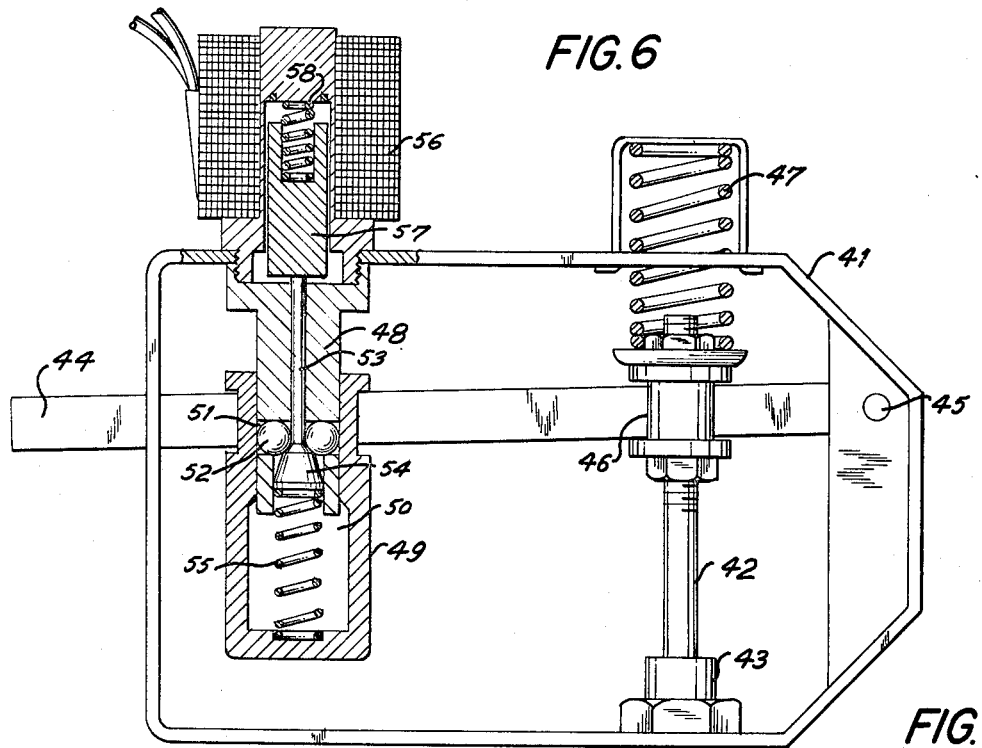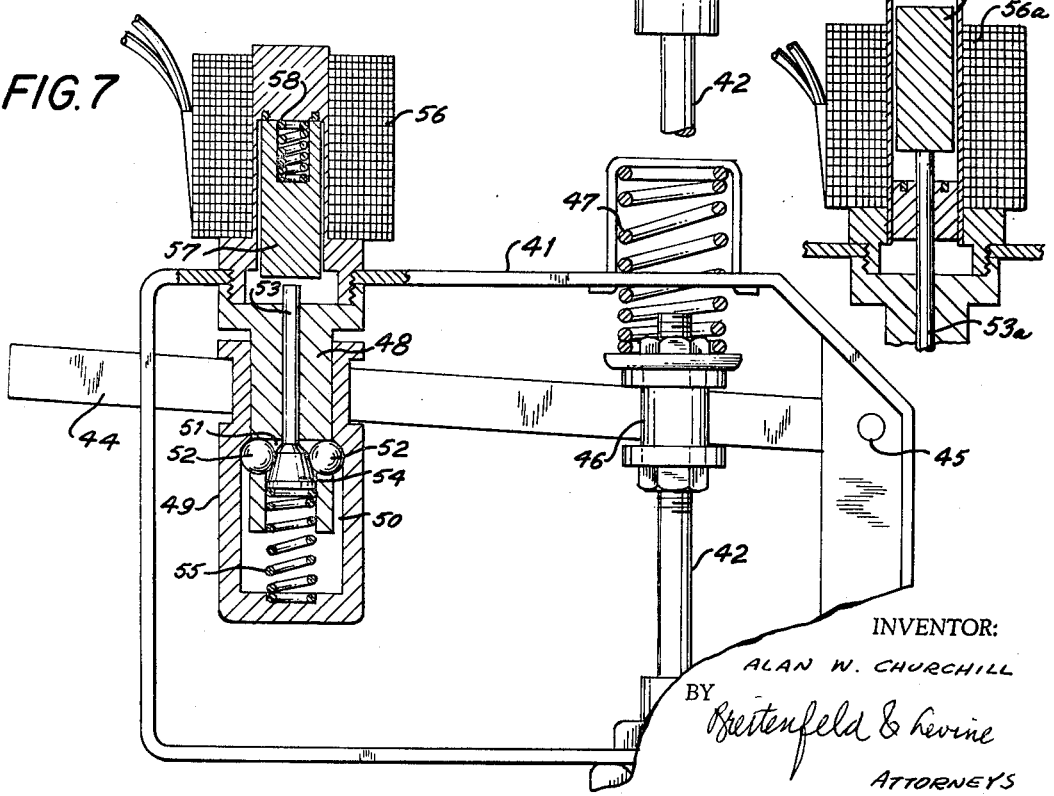

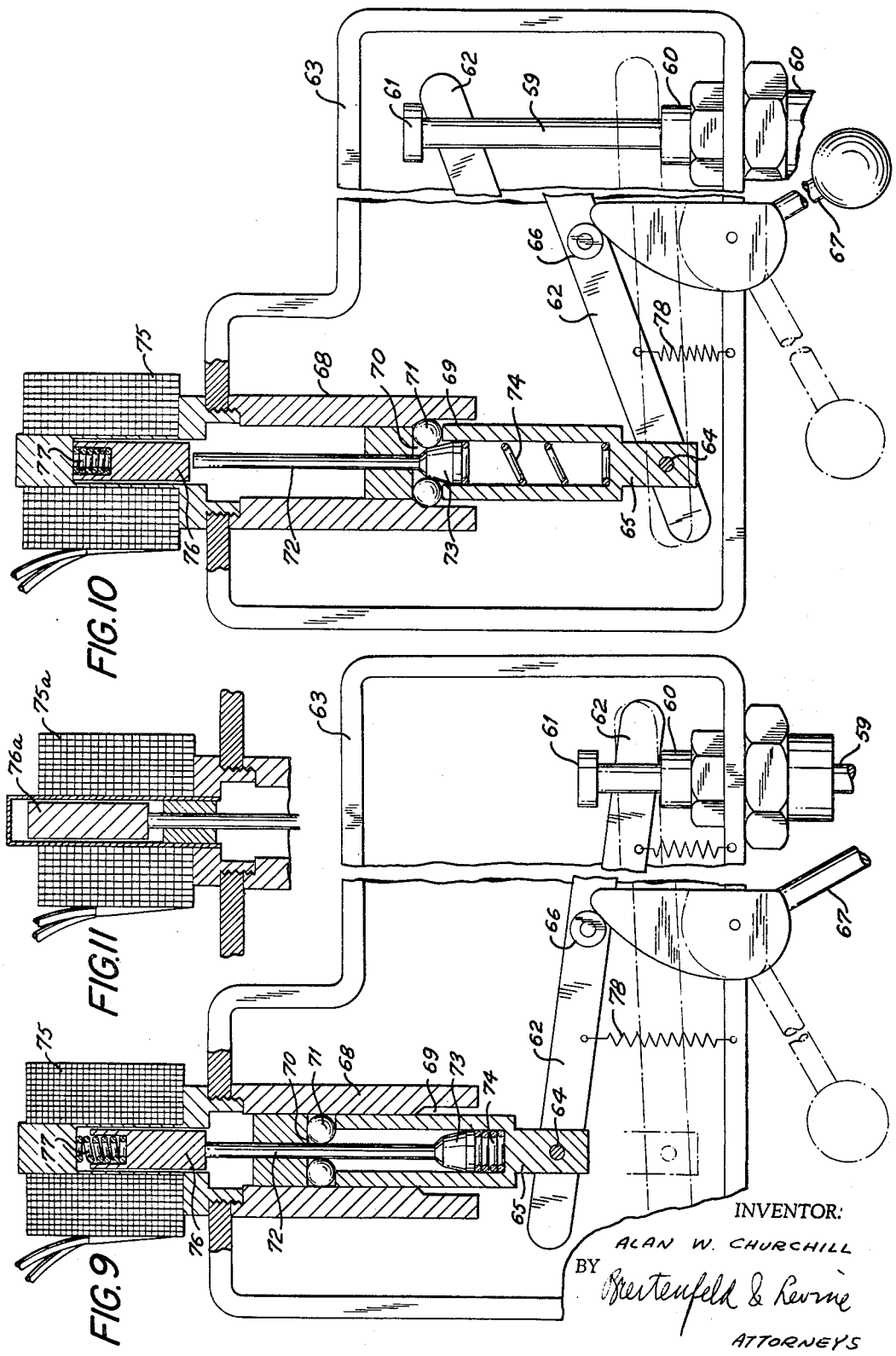

United States Patent Office 3,385,559
Patented May 28, 1968

3,385,559
RELEASABLE LATCH MECHANISM FOR CONTROL DEVICES, VALVES, AND THE LIKE
Alan W. Churchill, Caldwell, N.J., assignor to Automatic Switch Company, Florham Park, N.J., a corporation of New York
Filed May 12, 1965, Ser. No. 455,165
3 Claims. (Cl. 251—70)

ABSTRACT OF THE DISCLOSURE

Relatively slidable inner and outer cylindrical elements, outer element having recess in inner wall, inner element having opening accommodating a ball. Means, such as a wedging element, within inner member for urging ball into recess when recess and opening are in alignment, to latch elements.

Outer element may be fixed to a valve body, and inner element may be a valve disk carrier. Wedging means may be solenoid operated. Inner member may support fulcrum of a "free handle" control device.

---

This invention relates generally to releasable latch mechanisms.

It is a general object of the invention to provide a reliable means for temporarily securing two elements or parts of a device against relative movement, and for allowing instantaneous release by application (or removal) of a force that is only a small fraction of the force that may be secured or locked by such a means.

It is a more particular object of the invention to provide a latching mechanism which is structurally simple, relatively inexpensive to manufacture, unusually effective and reliable in performing its contemplated function, and easily adaptable to a large variety of industrial purposes.

Briefly stated, the mechanism involves a pair of concentrically associated elements mounted in either axial, rotative, or other slidable relation; a releasable latch element adapted to become so interposed between them, when the elements assume a predetermined positional relationship, that relative movement between the elements is reliably resisted; and an extremely simple low-energy means for releasing or tripping the latch, the tripping means being of a character which permits activation of it to be controlled, if desired, from a relatively remote point. This association of parts is admirably adapted for incorporation into any of numerous types of installations in which one part is to be releasably locked in a selected relation to another. An example is a valve in which a member is movably oriented with respect to a valve opening or seat. By means of the present latch mechanism the valve member can be locked in a selected setting (e.g., to hold the valve open), and tripped from either a near or a relatively remote point to allow a spring or other source of power to move the member out of such setting (e.g., to close the valve). Or, in the case of a "free handle" type of control of a valve or other apparatus, the latch mechanism can be made to serve the purpose of securing the fulcrum of a lever in a predetermined setting which makes the control handle effective, while tripping of the latch (from a distance if desired) releases the fulcrum so that it "floats" and thus makes the control handle completely ineffective. In general, almost any apparatus in which one of two parts is to be temporarily and releasably locked against movement with respect to the other, whatever the purpose of such a relationship may be, can be caused to embody the features of the improved latching mechanism to which the invention relates.

A particular objective of the invention is to provide a device whose latching effect can be controlled by minute movements of only two elements, whereby extremely small forces are effective to achieve the latching and latch-releasing functions, and whereby wear and tear are so minimized that long periods of useful life are assured without requiring lubrication or other attention.

A characterizing feature of the invention resides in the provision of a recess in the inner wall of an outer cylindrical element, a transverse opening in a slidably enclosed inner cylinder, a ball within the opening adapted to move radially outward so that it can intrude into the outer recess when the opening and recess are aligned, and a controllable means for applying and discontinuing outward pressure upon the ball. As a result of this association of parts, the ball can be operatively interposed or wedged between the concentrically related elements to resist movement in the direction which applies compressive force to the ball, and the interposition can be indefinitely maintained with a minimum of applied lateral force upon the ball. Whenever such force is discontinued, the offset relationship of the parts is such that the ball is automatically cammed out of the effective position into a retracted disposition within the inner opening, thereby restoring freedom of relative movement to the cylindrical elements.

Several embodiments of the invention, involving concentrically arranged cylindrical elements cooperating, by way of example, in axially slidable relation, are illustrated in the accompanying drawings, showing the nature of the mechanism, its mode of use, and its versatility.

In the drawings:

FIG. 6 is a simplified longitudinal cross-section of a trippable control device activated by an exposed handle, the device being equipped with the new latching mechanism and the parts being shown in unlatched or tripped condition;

FIG. 7 is a similar view showing the latched condition of the control;

FIG. 8 is a fragmentary view of an alternative solenoid-activated tripping device;

FIG. 9 is a simplified longitudinal cross-section of a control device of the "free handle" type equipped with the new latching mechanism, the parts being shown in tripped condition so that the handle is completely ineffective;

FIG. 10 is a similar view with the parts latched in a position making the handle effective; and FIG. 11 is a fragmentary view of an alternative solenoid-activated tripping device.

Figure 1:
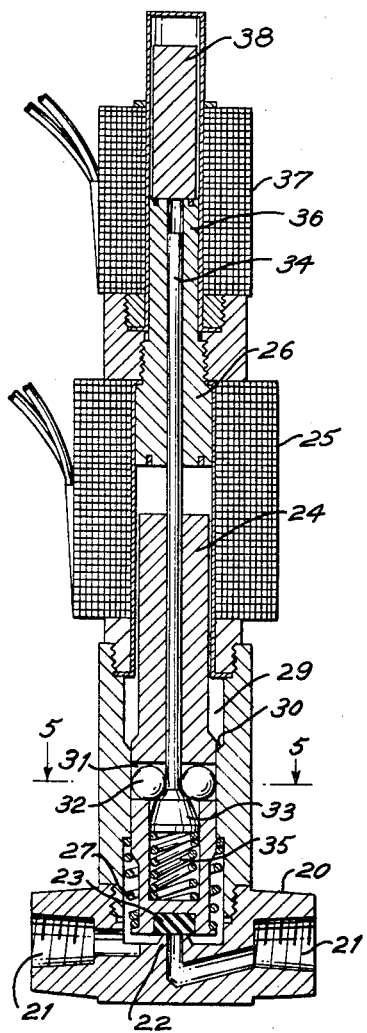
FIG. 1 is a longitudinal cross-section of a solenoid-operated valve equipped with the improved ball-lock mechanism, the valve being shown in closed condition.

The solenoid valve chosen for illustration in FIGS. 1–5 comprises a valve body 20 having inlet and outlet openings 21, a valve seat 22, and a valve disc 23 mounted for movements toward and away from the valve seat. The disc 23 is secured in conventional fashion to the end of a valve-disc carrier 24 which is a cylindrical element whose remote end constitutes the armature of a solenoid. The windings of the solenoid are indicated at 25. It is provided with the usual plug-nut 26. In the arrangement of parts chosen for illustration, energization of the solenoid draws the part 24 into the position of FIG. 2, thus lifting the disc 23 from the valve seat 22 to open the valve; and when the solenoid is de-energized a compression spring 27, operatively interposed between the valve body and the disc carrier, moves the latter into the position shown in FIG. 1 whereby the disc 23 seats itself upon the valve seat 22 and closes the valve.

Figure 2:
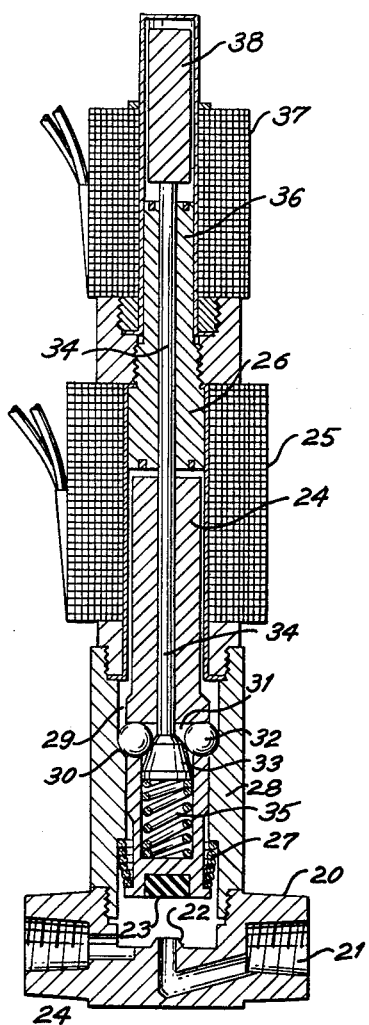
FIG. 2 is a similar view, with the valve latched in open condition.

It is the objective of the releasable latching mechanism to hold the part 24 in the position of FIG. 2, against the action of the spring 27, when the solenoid is de-energized. In this way, the valve can be latched in an open condition without requiring continued consumption of electrical energy to keep the solenoid activated.

Enclosing the carrier 24 is a concentric cylindrical element 28 secured to the valve body 20 at one end and to the supporting frame of the solenoid at the other. The cylindrical elements 24 and 28 are thus in axially slidable relation. The inner wall of the outer element 28 is provided with a recess 29. Preferably this recess is circumferential in extent, as shown, so that an annular shoulder 30 is provided at one end. This shoulder is preferably inclined to the longitudinal axis of the cylinder 28, as shown.

The inner cylindrical element 24 is provided with a transverse opening 31 which is so located that it can be brought into and out of registry or alignment with the recess 29 as the parts move relative to each other. Thus, in FIG. 1, the opening 31 is out of alignment with the recess 29; in FIG. 2 an alignment has been established.

Mounted for free movement within the transverse opening 31 is a ball 32 whose diameter is only slightly less than that of the opening 31 but greater than the depth of the recess 29. Preferably the opening 31 extends diametrically through the element 24, and there is a ball 32 at each end of the opening 31. When the opening 31 comes into alignment with the recess 29, the ball or balls 32 are enabled to move radially outward as shown in FIG. 2, each ball intruding into the recess 29. When the opening 31 is not in alignment with the recess 29 the ball or balls 32 are adapted to retreat into the dispositions shown in FIG. 1.

The latching mechanism includes a means for applying and discontinuing outward radial pressure upon each ball 32. This is preferably achieved by a conically shaped wedging element 33 mounted on a rod 34 which extends through a longitudinal bore extending through the inner cylindrical element 24 and intersecting the transverse opening 31. This bore is preferably along the central axis. A means is provided for effecting minute longitudinal back-and-forth movements of the rod 34 and the wedging element 33 carried by it. In the device illustrated the rod 34 rests yieldably upon a spring 35 mounted in a suitable opening within the disc carrier 24. The rod 34 extends upwardly through the plug-nut 26 and through an extension 36, the parts 26 and 36 being provided for this purpose with an axial bore.

The part 36 constitutes the plug-nut of a tripping solenoid 37 effective, when energized, to draw an armature 38 from the position of FIG. 2 downwardly against the plug-nut 36 as shown in FIG. 1.

The latching mechanism functions as follows: The parts are shown in tripped condition in FIG. 1. Neither solenoid is energized, and the disc carrier 24 is held down against the valve seat 22 by the compressive force of the spring 27. The armature 38 of the tripping solenoid rests by gravity upon the plug-nut 36. The transverse opening 31 in the inner cylindrical element is out of alignment with the recess 29, and accommodates the balls 32 in their retracted disposition. When the solenoid 25 is energized to open the valve, the disc carrier 24 is lifted, and as soon as the opening 31 comes into alignment with the recess 29 the spring 35 is effective to lift the wedging element 33 by a slight amount, thus exerting an outward radial force upon the balls 32 and moving them into the disposition shown in FIG. 2. At the same time, the upper end of the rod 34 encounters the armature 38 and lifts it to the position shown in FIG. 2. The parts are now held in a latched condition, and the valve will remain open even though energization of the solenoid 25 is discontinued.

Figure 3:
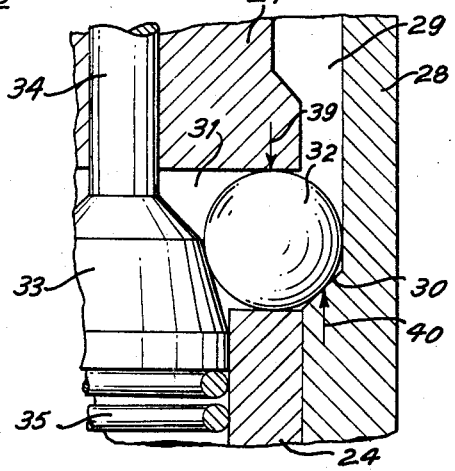
FIG. 3 is an enlarged fragmentary view of the latching mechanism with the parts in the relationship shown in FIG. 2.

The latching action is most clearly illustrated in FIG. 3. The upward force of the spring 35 upon the wedging element 33 presses each ball 32 outwardly. In this disposition of the parts, the compressed spring 27 exerts a downward force 39 upon the ball 32. At the same time, an upward force 40 is exerted upon the ball by the shoulder 30. The ball is thus operatively interposed between the parts 24 and 28, so that a compressive force is exerted upon the ball by the opposing forces 39 and 40. It will be noted that the forces 39 and 40 are offset from each other, so that the ball 32 would retreat into the opening 31 if it were not for the outward pressure exerted upon it by the wedging element 33. The force of the wedging element can be extremely small, but as long as such outward force upon the ball is present, the ball remains operatively squeezed between the parts 24 and 28, thus restricting movement in the valve-closing direction. Tests have shown that in an arrangement of the character shown in FIG. 3 a load of twenty-five pounds applied between the points of contact 39 and 40 can be reliably maintained even though the outward latching force of the element 33 is only of the order of ten ounces.

When the latching mechanism is to be released or tripped, the solenoid 37 is momentarily energized, thereby urging the armature 38 in a downward direction. This exerts a downward pressure upon the rod 34, displacing the wedging element 33 and allowing the conjoint effect of the forces 39 and 40 to cam the ball 32 inwardly. The sloping nature of the shoulder 30 facilitates this action. The force 39 thereupon becomes effective to restore the parts to the tripped condition shown in FIG. 1.

Figure 4:
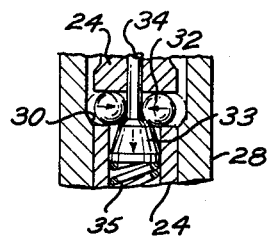
FIG. 4 is a fragmentary view of the latching mechanism at the instant of release.
Figure 5:
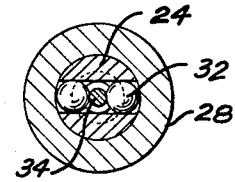
FIG. 5 is a cross-section on line 5—5 of FIG. 1.

An advantage of the latching mechanism is that the tripping force, i.e., the force drawing the armature 38 downward from the position of FIG. 2, can be extremely small and can always be so because it does not have to change in direct proportion to any increase in load applied at the points 39 and 40. Moreover, there is no possibility of a partial trip or mid-position hang-up since the slightest displacing of the wedging element 33 from its latching position is sufficient to initiate the unlatching action. The unlatching action is depicted in FIG. 4 at about the time of its initiation. The balls 32 move inwardly from the dotted positions to the full-line positions as soon as downward movement of the wedging element 33 has been brought about. It will be understood, of course, that the relationship of parts shown in FIG. 4 is one that exists only for an instant, since the entire shifting of parts from the position of FIG. 2 to that of FIG. 1 takes only a small fraction of a second when the tripping solenoid 37 is energized.

In FIGS. 6 and 7 the latching mechanism is shown in association with a control device intended to be actuated by hand rather than by a solenoid. The parts are shown mounted within a suitable housing 41, the cover of the housing having been removed to reveal the parts that are normally concealed and inaccessible. A rod 42 represents the article to be controlled, i.e., the rod might be, for example, a valve stem. It is mounted in slidable relation to a bearing 43 and is axially adjustable between the lowered position of FIG. 6 and the raised position of FIG. 7. This movement is brought about by application of a lifting force to the end of a control handle 44 pivoted at 45 and engaging the rod 42 in the region 46. The rod 42 is normally urged downwardly by the spring 47, and the function of the latching mechanism is to retain the rod in the raised position of FIG. 7.

The latching mechanism consists, as hereinbefore described, of an inner cylindrical element 48 and an outer cylindrical element 49. These parts are arranged in axially slidable relation, but in this case it is the inner element 48 that is positionally fixed while the outer element 49 is movable. Movements of the element 49 are brought about by associating it with the handle 44, as shown.

The element 49 is provided with the recess 50 in its inner wall, and this recess is preferably circumferential in its extent. The inner element 48 is provided with a transverse opening 51 extending diametrically through the element 48 and accommodating balls 52. The element 48 is also provided with an axial bore adapted to accommodate a reciprocable rod 53 upon which a conical wedging element 54 is mounted. This element is shiftable through a small distance so that it may optionally be caused to exert an outward radial pressure upon the balls 52 or to discontinue such pressure. A spring 55 is interposed between the end wall of the outer element 49 and the wedging element 54, tending constantly to press the element 54 in an upward direction.

Mounted in fixed association with the housing 41 is a solenoid 56 whose armature 57 lies in the path of upward movement of the rod 53. A compression spring 58 constantly urges the armature 57 into the downward disposition shown in FIG. 6. With the solenoid de-energized, as shown in FIG. 6, the armature 57 is pressed downwardly against the rod 53, depressing the element 54 and allowing the balls 52 to assume a retracted disposition within the transverse opening 51. The handle 44 is in its downward position, and the element 42 is correspondingly in its lowered disposition. The element 42 can be raised by simply raising the handle 44, and if it is to be latched in its raised position the solenoid 56 is energized to withdraw the armature into the raised position shown in FIG. 7. Under these circumstances, when the handle 44 is raised and the parts 48 and 49 are brought into a relationship in which the transverse opening 51 comes into alignment with the recess 50, the wedging action of the part 54 causes the balls 52 to move radially outward into the latching disposition shown in FIG. 7. It is the action of the spring 55 upon the wedging element 54 that exerts the outward latching pressure upon the balls 52. In this relationship of the parts, the tendency of outer element 49 to resume the lower position of FIG. 6 is resisted by the circumstance that the balls 52 are interposed between it and the fixed inner element 48. The balls remain in this interposed disposition as long as there is an outward pressure upon them, exerted by the wedging element 54.

The tripping of the latching mechanism is brought about by de-energizing the solenoid 56. This allows the spring 58 to press the armature 57 downwardly against the rod 53, causing a slight axial displacement of the wedging element 54 from the position shown in FIG. 7. As a result, the balls 52 are immediately cammed inwardly, allowing the outer element 49 to drop. The spring 58 is stronger than the spring 55, and thus allows the armature 57 to press the rod 53 downwardly whenever the holding force of the solenoid 56 is discontinued.

An alternative arrangement is shown in FIG. 8, whereby the solenoid 56a is normaly de-energized, and brings about a tripping of the latching mechanism only when it is momentarily energized. In this case there is no spring urging the armature 57a downwardly, and the rod 53a is of a length which presses upwardly upon the armature 57a when the parts are in the latched disposition of FIG. 7. The tripping of the latch is brought about by energizing the solenoid 56a, as a result of which the armature 57a is drawn downwardly and thus exerts a downward force upon the rod 53a, displacing the wedging element and thus bringing about a discontinuance of outward radial pressure upon the balls 52.

In FIGS. 9–11, the latching mechanism is shown in association with a control device of the "free-handle" type. In the device depicted, an opened housing 63 is shown. The element to be controlled is a rod 59 slidably mounted in a bearing 60 and provided at its inner end with an enlargement 61 or the like whereby the end of a lever 62 may become effective to raise the element 59 to the position of FIG. 10. As hereinabove mentioned, the rod 59 might be a valve stem, although its movements between the positions shown in FIGS. 9 and 10 might obviously be employed to activate any of a large variety of devices.

The lever 62 has a fulcrum 64 in the form of a pivot between the lever and the inner cylindrical element 65 of a latching mechanism of the present type. The lever is also provided with a follower 66 adapted to respond to pressure exerted by the operative face of a handle 67. The normal (inactive) disposition of the handle is shown in dot and dash lines. Whenever the lever is to be activated to lift the rod or other element 59 from the position of FIG. 9 to that of FIG. 10, the handle 67 is swung into the disposition shown in full lines. If the fulcrum 64 is securely held in the operative or effective position shown in FIG. 10, the manipulation of the handle 67 raises the lever as shown in FIG. 10. On the other hand, if the fulcrum 64 of the lever is not positionally secure, the lever assumes the ineffective disposition shown in FIG. 9 when pressure is exerted upon the handle 67.

It is the objective of the latching device to hold the fulcrum 64 in the operative disposition shown in FIG. 10.

The latching device includes not only the inner cylindrical element 65 but also the outer cylindrical element 68. The latter is secured to the housing 63 and the inner element 65 is axially movable with respect thereto. The inner wall of the element 68 is provided with a recess 69, and the element 65 is provided with a transverse opening 70 preferably extending diametrically across the element 65. A pair of latching balls 71 are mounted in the opening 70. The part 65 is also provided with an axial bore through which a rod 72 extends, there being a conical wedging element 73 at the lower end of this rod, and a spring 74 which constantly presses upward upon the element 73.

Secured to the housing 63 is a solenoid 75 arranged to function in the same way as the solenoid 56 of FIGS. 6 and 7. An armature 76 is urged downward by the spring 77, this spring being stronger than the spring 74 so that when the solenoid 75 is de-energized the wedging element 73 is held in a depressed position. This means that the balls 71 remain retracted, there being no outward radial pressure upon them. Accordingly, movement of the handle 67 from the dot-and-dash position of FIG. 9 to the full line position is ineffective to lift the rod 59, and the lever 62 is simply swung in a clockwise direction against the action of the return spring 78.

On the other hand, if the solenoid 75 is energized to lift the armature 76 into the disposition of FIG. 10, the spring 74 is effective to raise the wedging element 73 by a slight amount, thus exerting an outward radial pressure upon the balls 71. As a result, the balls assume the latching disposition shown in FIG. 10, and remain operatively interposed between the parts 65 and 68 as long as this outward radial pressure upon them continues. The inner element 65 is thus held against upward movement into the outer element 68, and when the handle is swung from the dot-and-dash position of FIG. 10 to the full line position the lever swings in a counterclockwise direction around the fulcrum 64 and becomes effective to lift the rod 59. This disposition of the parts is retained as long as the wedging element 73 remains in its slightly elevated position, and this position is retained as long as the solenoid 75 is energized and keeps the armature 76 raised against the action of the spring 77. Whenever the latching mechanism is to be tripped or released, the solenoid 75 is de-energized, whereupon the spring 77 presses the armature 76 downwardly against the end of the rod 72, slightly depressing the wedging element 73 and allowing the balls 71 to move radially inward to their retracted positions. Under such circumstances the upward pressure upon the fulcrum 64 pushes the inner element 65 into the outer element 68 as shown in FIG. 9. Once the fulcrum 64 becomes "floating" and is no longer positionally fixed, the lever 62 and the control handle 67 are completely ineffective to restore the part 59 to the raised position of FIG. 10.

This type of control device is effective to guard against a malfunctioning of an apparatus being controlled. As long as the functioning is in conformity with a predetermined plan, the solenoid 75 remains activated as shown in FIG. 10, but as soon as there is any failure an electric circuit (not shown) becomes effective to de-energize the solenoid 75. The advantage of the "free handle" resides in the fact that the apparatus being controlled cannot be propped into an active disposition by simple manipulation of the handle 67; it is essential that the defect in the system be rectified before the solenoid 75 can become reactivated to allow the handle 67 and the lever 62 to become effective again.

An alternative arrangement of the solenoid is shown in FIG. 11, this arrangement corresponding to that shown in FIG. 8. When the solenoid 75a is de-energized the spring 74 is effective to move the wedging element 73 upward to a slight extent, and the rod 72 is long enough to press upward against the armature 76a as shown in FIG. 11. Tripping of the mechanism is brought about by momentarily energizing the solenoid 75a, whereupon the armature 76a is drawn downwardly and displaces the rod 72 and the element 73 carried by it so that the outward radial pressure upon the balls 71 is discontinued.

Other uses for the latching mechanism will readily suggest themselves to those skilled in the art. It will thus be seen that a latching mechanism of extreme simplicity has been provided, requiring only simple machined parts, no unusual manufacturing precision, and an extremely small latching and unlatching force which is independent of the load which the latched apparatus carries.

In many respects it will be understood that the details herein described and illustrated might be modified without necessarily departing from the spirit and scope of the invention as expressed in the appended claims.

What is claimed is:

1. A releasable latch mechanism comprising inner and outer cylindrical elements mounted in axially slidable relation to each other, the outer element being provided with a recess of circumferential extent in its inner wall, the inner element being provided with a transverse opening extending diametrically through it, a ball mounted in each of the opposite ends of said opening and movable radially into and out of said recess when the opening and recess are in alignment, said recess being of less depth than the ball diameters, said inner element being provided with an axial bore, and remotely controllable means for applying and discontinuing outward pressure upon said balls, said means comprising a longitudinally shiftable rod in said bore, a solenoid effective to control shifting movement of said rod, and a conically contoured wedging element carried by said rod and adapted to engage said balls and cam them radially outward, the maximum spacing between said balls when they are in said recess being smaller than the maximum diameter of said wedging element, whereby intrusion of said balls into said recess brings them into latching interposition between said elements to resist relative movement of said elements in the direction which applies compressive force to said balls, said interposition being maintained as long as outward pressure is applied to said balls by said wedging element.

2. In a solenoid valve, a valve body having a part defining a hollow cylinder, a valve seat whose axis coincides with that of said cylinder, a valve disc carrier mounted in said cylinder in slidable relation thereto, a spring urging said carrier toward the valve seat, a solenoid effective upon said carrier to lift it from the valve seat, the inner wall of said cylinder being provided with a recess, the carrier being provided with a transverse opening, said opening and recess being so located that they come into alignment when the carrier is lifted, and a releasable latch mechanism independent of said solenoid for retaining the carrier in lifted position, said latch mechanism comprising a ball mounted in said opening and movable radially into and out of said recess when said alignment occurs, said recess being of less depth than the ball diameter, and control means for applying and discontinuing outward pressure upon said ball, whereby intrusion of the ball into said recess brings it to an interposed latching disposition which resists movement of the carrier toward the valve seat, said interposed disposition being maintained as long as outward pressure is applied to the ball, said carrier being provided with an axial bore, and said control means comprising a shiftable rod in said bore, a wedging element carried by said rod and shaped to engage said ball and cam it radially outward, and a trip solenoid and spring cooperatively effective to control the shifting movements of said rod.

3. A "free-handle" control device comprising a lever having a movable fulcrum, said lever being effective only when said fulcrum is secured in a predetermined position, a control handle, means for applying a force through said handle to one arm of the lever, the other arm of the lever being connected to a load, and a releasable latch mechanism for securing the lever fulcrum in said predetermined position, said mechanism comprising inner and outer cylindrical elements mounted in axially slidable relation to each other, one of said elements supporting said fulcrum and the other being positionally fixed, the outer element being provided with a recess in its inner wall, the inner element being provided with a transverse opening therein, a ball mounted in said opening and movable radially into and out of said recess when the opening and recess are in alignment, said opening and recess being so located that they come into alignment when the fulcrum is in said predetermined position, said recess being of less depth than the ball diameter, and control means for applying and discontinuing outward pressure upon said ball, whereby intrusion of the ball into said recess brings it to an interposed latching disposition which resists movement of the fulcrum out of said predetermined position, said interposition being maintained as long as outward pressure is applied to the ball, said inner element being provided with an axial bore, and said control means comprising a shiftable rod in said bore, a wedging element carried by said rod and shaped to engage said ball and cam it radially outward, and a trip solenoid and spring cooperatively effective to control the shifting movements of said rod.

References Cited

UNITED STATES PATENTS

| 2,733,042 | 1/1956 | Culbertson | 251—294 X |
| 2,203,691 | 6/1940 | Mantz | 251—74 X |
| 2,224,147 | 12/1940 | Ehlers | 251—70 |
| 2,363,117 | 11/1944 | Butler | 251—68 |
| 2,632,821 | 3/1953 | Wright et al. | |
| 2,701,116 | 2/1955 | Roth | 251—66 |
| 2,773,042 | 1/1956 | Culbertson | 251—294 X |
| 3,008,479 | 11/1961 | Mancusi | 251—74 X |
| 3,036,541 | 5/1962 | Musick et al. | 251—138 X |
| 3,082,627 | 3/1963 | Drake et al. | 251—68 X |
| 3,094,004 | 6/1963 | Berck | 251—67 X |
| 3,115,330 | 12/1963 | Dollison | 251—74 X |
| 2,885,893 | 5/1959 | Lane et al. | 74—527 X |

M. CARY NELSON, *Primary Examiner.*

R. C. MILLER, *Assistant Examiner.*